June 14, 1938.  C. WILLIAMS ET AL  2,120,422
AUTOMOBILE TOWING DEVICE
Filed Sept. 2, 1937    2 Sheets-Sheet 1
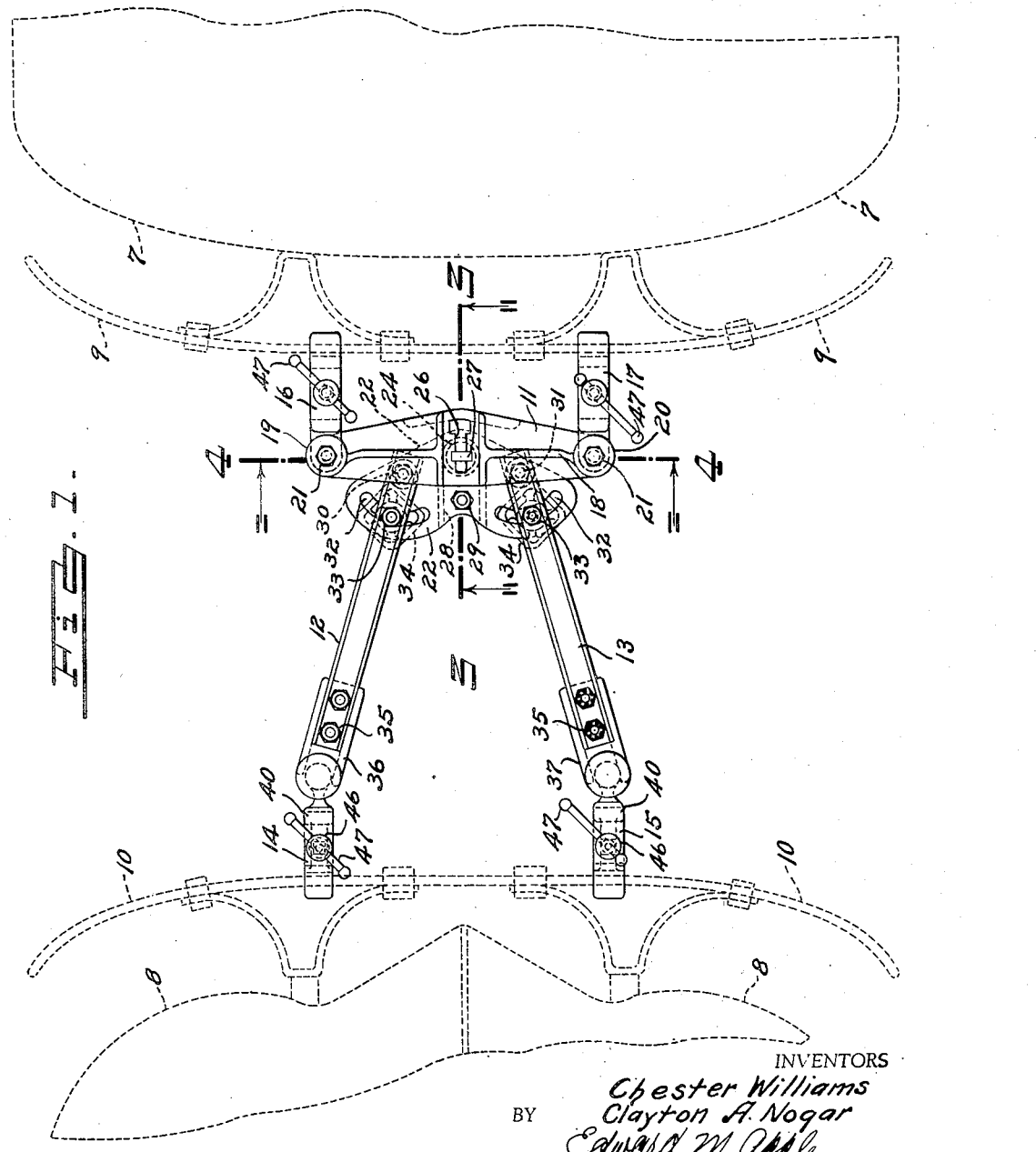
INVENTORS
Chester Williams
Clayton A. Nogar
BY
Edward M. Apple
ATTORNEY.

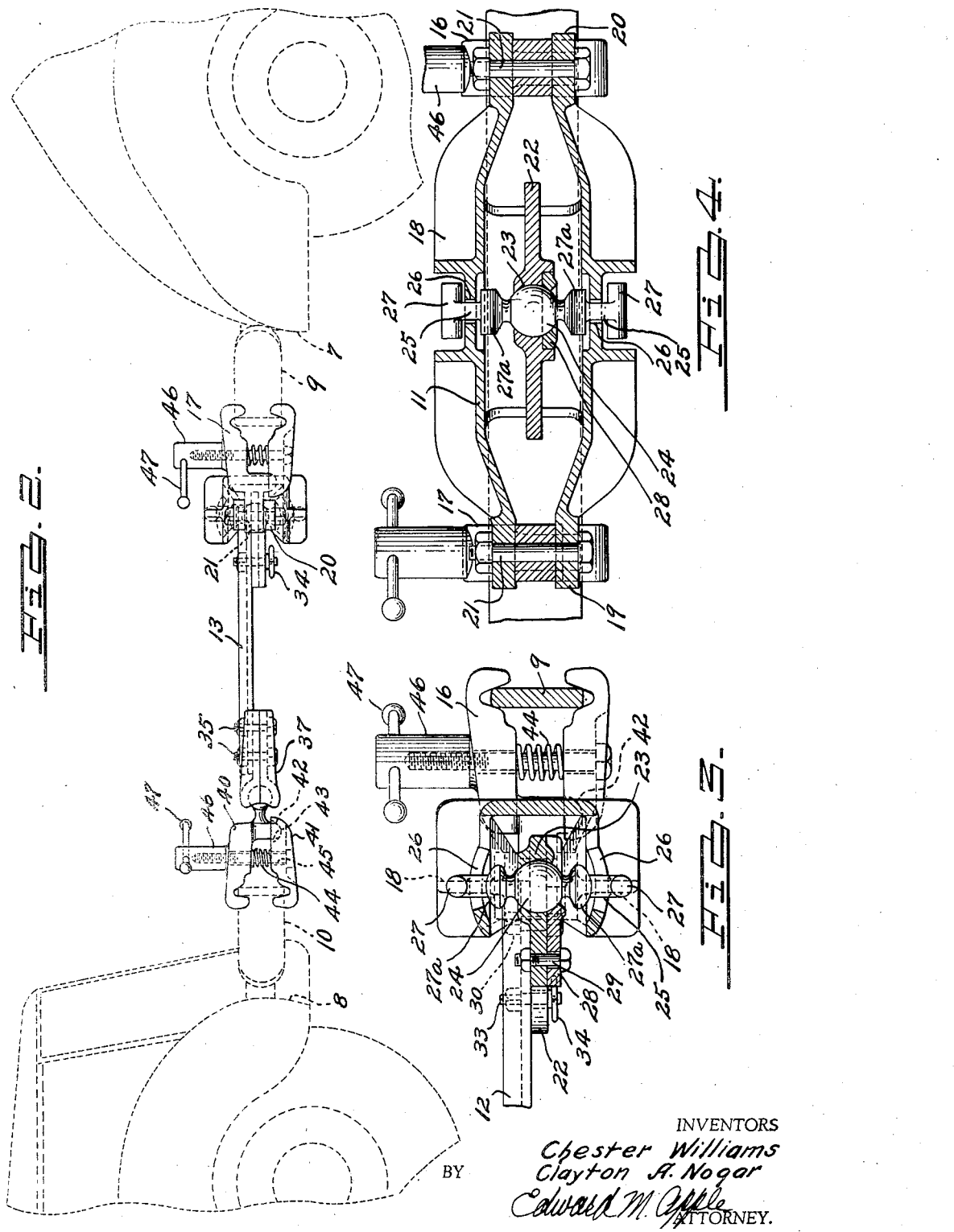

Patented June 14, 1938

2,120,422

UNITED STATES PATENT OFFICE 2,120,422

AUTOMOBILE TOWING DEVICE

Chester Williams, Dearborn, and Clayton A. Nogar, Dundee, Mich.

Application September 2, 1937, Serial No. 162,176

4 Claims. (Cl. 280—33.44)

This invention relates to towing devices and has particular reference to a device for towing automobiles.

An object of the invention is to generally improve towing devices of the character referred to and to provide a towing device which is simple in construction, light in weight and one which is readily collapsible and easy to fold and transport.

Another object of the invention is the provision of a device of the character referred to which may be readily installed in a few minutes by a layman without special equipment.

Another object of the invention is the provision of a device which will have universal application to all makes and types of automobiles without the necessity of providing special fittings to enable it to be attached and used.

Another object of the invention is the provision of an improved towing device, the use of which eliminates much of the danger heretofore encountered in the towing of one automobile by another.

A still further object of the invention is the provision of a device of the character referred to wherein the parts may be readily adjusted to compensate for wear occasioned by use.

Further objects of the invention will appear as the description proceeds.

In order to use the devices heretofore known, it became necessary for a skilled mechanic to be employed for a period ranging from an hour to an hour and one-half to assemble and connect the device to the towed and towing automobiles. A like period of time being required to disassemble it. To utilize the present known types of towing devices, the mechanic had to crawl under the cars or had to elevate the cars on jacks or hoists in order to attach the device to both the towing and towed automobiles. After elevating the cars, the mechanic then had to disconnect the steering arm and the drag link of the car to be towed and connect the drag link of the tow bar to the tie rod of the automobile to be towed. In making these connections the mechanic had to make certain that the wheels of the car to be towed were in proper alignment so that the towing operation would not be interfered with. Having connected the tow bar to the automobile to be towed, it then became necessary to connect the opposite end of the tow bar to either the rear axle or rear spring of the towing automobile.

With the development of individual wheel suspensions for automobiles, the problem was made even more difficult inasmuch as it became necessary to make special fittings for each individual type and model of automobile before the tow bar could be connected thereto.

Another disadvantage in the use of the present known types of towing equipment resides in the dangers encountered in applying the brakes on the towing automobile when traveling at comparatively high rates of speed. With the present known types of towing equipment, the operator often experiences the difficulty of having the rear end of the towing automobile lifted from the road by the sudden application of the brakes. This is caused by the upward thrust of the tow bar which is usually inclined from the axle or spring of the towing car to the tie rod of the car being towed. Many serious accidents have resulted from this tendency of the car being towed to raise the rear end of the towing car from the road on the application of the brakes.

The foregoing difficulties are overcome and other advantages are effected in the use of our improved towing device.

In the accompanying drawings we have illustrated a preferred form of our device, in which drawings:

Fig. 1 is a top plan view of our device illustrating the manner in which it may be used to tow one automobile back of another.

Fig. 2 is a side elevation of the device illustrated in Fig. 1.

Fig. 3 is a section taken on line 3—3 of Fig. 1.

Fig. 4 is a section taken on line 4—4 of Fig. 1.

Referring now more particularly to the drawings (Fig. 1), it will be seen that in the embodiment herein disclosed we have illustrated our improved towing device in operating position between two automobiles which are illustrated in part by dotted lines. The towing car being designated by the reference character 7 and the car being towed by the reference character 8. It will be noted that our device is connected directly to the bumpers 9 and 10 of the respective cars. Broadly speaking our improved device consists of a yoke 11, diverging arms 12 and 13 and clamp jaws 14, 15, 16 and 17 arranged as illustrated in Figs. 1 and 2. The yoke 11 is a steel forging or casting formed with reinforcing ribs 18 and terminating at each end in clevises 19 and 20 to which the clamp jaws 16 and 17 are secured by means of clevis pins 21. It is desirable that the clamp jaws 16 and 17 be adjustable on the clevis pins 21 so that they may be readily secured to different types of automobile bumpers, some of which may be equipped with bumper guards or have their supporting brackets in various positions. A swivel plate 22, which is provided with a socket 23, is mounted for engagement with a ball 24 carried intermediate the ends of the member 25, the latter being arranged to engage slots 26 formed in the yoke 11. The member 25 is provided with heads 27 and 27a arranged to prevent its vertical displacement. A retainer 28, which is secured to the plate 22, by means of a bolt 29 (Fig. 3) prevents the member 25 from being displaced horizontally. This construction permits the plate 22 to pivot on the ball 24 and overcomes differences in road conditions.

The arms 12 and 13 are pivoted as at 30 and 31 to the plate 22, the latter being provided with arcuate slots 32 arranged to engage bolts 33 which extend through the arms 12 and 13 and are provided with large nuts 34 which may be readily loosened or tightened by hand. The opposite ends of the arms 12 and 13 have secured thereto by bolts 35 sockets 36 and 37, which are arranged to engage the balls 38 and 39 to provide universal movement.

The clamp jaws 14, 15, 16 and 17 are similar in construction and consist of one fixed jaw 40 and one moveable jaw 41 (Fig. 2). The moveable jaw 41 has a recess 42 adapted to receive a round nose 43 which permits the jaw 41 to be pivoted thereon. A compression spring 44 is positioned between the jaws and normally keeps them open. The jaws are drawn together by means of a bolt 45 which extends through them and into an internally threaded head 46, which is provided with a slidable cross pin 47 with which it may be rotated.

Our device differs from devices of this nature heretofore employed in that it is designed to fasten direct to the bumpers. As a result we are able to get practically a horizontal pull from one bumper to another thus obviating any tendency of the car being towed to lift the rear end of the towing car when the brakes are suddenly applied. With a device such as herein described one car may be readily towed by another without having to disconnect the steering equipment of the car being towed. We have found, however, that much better results are obtained with our device if some of the air is removed from the front tires of the car being towed. This gives better road traction and enables the device to turn the towed automobile more easily. A device constructed and attached in the manner herein taught has no tendency to twist or distort the bumpers of the cars as the guiding action is a pulling action on one arm and a pushing action on the other as turns are made. This device is easily secured in place for use and may be readily taken off and stowed away under a seat or in a luggage trunk. It has great advantage in the towing of automobiles equipped with independent wheel suspension as it is not necessary to attach the device direct to the steering mechanism of the towed car.

Having described our invention, what we claim and desire to secure by Letters Patent is:

1. In a device of the character described, the combination of a yoke terminating at either end in a clevis, a clamp jaw pivoted in each clevis, a plate rockingly mounted to said yoke, two spaced apart arms pivoted to said plate, each arm having a clamp jaw secured at its free end with a ball and socket joint.

2. In a device of the character described, the combination of a yoke, means to moveably secure said yoke to an automobile, a plate moveably secured to said yoke, divergent arms pivoted at one end to said plate, arcuate slots in said plate arranged to engage bolts extending through said arms, means to connect the free ends of said arms to an automobile, said last named means being connected to said arms by attaching means adapted for universal movement.

3. In a device of the character described, the combination of a yoke, clamp jaws to secure said yoke to an automobile, a plate movably secured to said yoke, arms pivoted to said plate in spaced relation, means coacting between said arms and said plate to limit the divergence of said arms, and a clamp jaw, arranged for universal movement, secured to the free end of each arm.

4. In a device of the character described, the combination of a yoke, comprising upper and lower horizontal members terminating in a clevis at either end, a clamp jaw pivoted to each clevis, a swivel plate, having a socket, positioned between said members, a removable vertical member extending between said first members, said vertical member having a ball adapted to engage the said plate socket, arms pivoted to said plate in spaced relation to one another, arcuate slots in said plate arranged to engage bolts extending through said arms, and a clamp jaw, arranged for universal movement, secured to the free end of each arm.

CHESTER WILLIAMS.
CLAYTON A. NOGAR.